US005746109A

United States Patent [19]

Matsuda

[11] Patent Number: 5,746,109

[45] Date of Patent: May 5, 1998

[54] HYDRAULIC SYSTEM FOR CONTROLLING A MOWER UNIT THROUGH A RAISING AND LOWERING MECHANISM

[75] Inventor: Kenji Matsuda, Sakai, Japan

[73] Assignee: Kubota Corporation, Osaka, Japan

[21] Appl. No.: 637,197

[22] Filed: Apr. 9, 1996

[30] Foreign Application Priority Data

Apr. 27, 1995 [JP] Japan .................................... 7-103602

[51] Int. Cl.[6] ............................ F15B 11/08; F16D 39/00

[52] U.S. Cl. ................................ 91/448; 60/484; 60/487

[58] Field of Search ............................ 91/443, 444, 448; 60/487, 484, 489

[56] References Cited

U.S. PATENT DOCUMENTS

| | | | |
|---|---|---|---|
| 4,962,675 | 10/1990 | Aoi et al. | 60/487 X |
| 5,074,194 | 12/1991 | Hirata et al. | 60/484 X |
| 5,079,919 | 1/1992 | Nakamura et al. | 60/484 X |
| 5,101,627 | 4/1992 | Fuji et al. | 60/486 X |
| 5,333,452 | 8/1994 | Dameron | 60/484 |

FOREIGN PATENT DOCUMENTS

| | | |
|---|---|---|
| 53228816 | 12/1993 | Japan . |
| 7274657 | 10/1995 | Japan . |

*Primary Examiner*—Hoang Nguyen
*Attorney, Agent, or Firm*—Felfe & Lynch

[57] ABSTRACT

A hydraulic system for controlling a mower unit through a raising and lowering mechanism. This system includes a hydraulic cylinder connected to the raising and lowering mechanism, a control lever for controlling the mower unit, and a valve unit including a main control valve, an auxiliary control valve and a throttle valve connected in series between a hydraulic pressure source and the hydraulic cylinder. In response to operation of the control lever, the valve unit selectively produces a raising state for supplying pressure oil to the hydraulic cylinder to raise the mower unit, a lowering state for draining pressure oil from the hydraulic cylinder to lower the mower unit by gravity, a neutral state for stopping supply and drainage of pressure oil to/from the hydraulic cylinder to maintain mower unit still, and a half floating state for supplying pressure oil to the hydraulic cylinder and draining pressure oil from the hydraulic cylinder through the throttle valve to apply to the mower unit a raising force less than a gravitational lowering force. The auxiliary control valve is controllable in response to movement of the main control valve, to produce the half floating state when the control lever moves from a lowering position to a neutral position.

5 Claims, 16 Drawing Sheets

HYDRAULIC SYSTEM FOR CONTROLLING A MOWER UNIT THROUGH A RAISING AND LOWERING MECHANISM

BACKGROUND OF THE INVENTION

FIELD OF THE INVENTION

The present invention relates to a hydraulic system for controlling a mower unit through a raising and lowering mechanism.

The mower unit supported by a tractor has gauge wheels contacting the ground during a grass cutting operation. These gauge wheels bear the weight of the mower unit. The Japanese patent application laid open under No. 5-328816, for example, discloses a hydraulic system for reducing the burden falling on gauge wheels. This hydraulic system includes a control valve having three positions, i.e. a raising position, a neutral position and a lowering position, for controlling a raising hydraulic cylinder. When the control valve is in the lowering position, pressure oil is supplied to the hydraulic cylinder, and at the same time drained therefrom to a tank through a throttle valve. As a result, a hydraulic pressure is applied to the mower unit to an extent short of lifting the mower unit but sufficiently reducing the weight of the mower unit falling on the gauge wheels. While this hydraulic system is capable of reducing the weight of the mower unit falling on the gauge wheels, lowering of the mower unit is retarded since pressure oil is supplied to a raising side of the hydraulic cylinder whenever the mower unit is lowered. This results in a disadvantage of low operating efficiency where raising and lowering of the mower unit are repeated frequently.

A proposal to overcome this disadvantage is disclosed in the Japanese patent application laid open on Oct. 24, 1995 under No. 7-274657 (filed Apr. 8, 1994: application No. 6-70955). The hydraulic system disclosed therein includes a four-position control valve having a half floating position in addition to the three positions, i.e. the raising position, neutral position and lowering position, for controlling a raising hydraulic cylinder. When the control valve is in the raising position, pressure oil is supplied to the hydraulic cylinder to raise a mower unit. When the control valve is in the lowering position, the pressure oil in the hydraulic cylinder is drained to a tank to allow the mower unit to lower quickly by gravity. When the control valve is in the neutral position, pressure oil flow to and from the hydraulic cylinder is stopped to stop the mower unit at a selected position. When the control valve is in the half floating position, the hydraulic cylinder communicates with a hydraulic pressure source and also with the tank through a throttle valve, to apply to the mower unit a raising force less than the weight of the mower unit. With this construction, the mower unit may be lowered quickly, when desired, by switching the control valve to the lowering position. However, the control valve with the four control positions is somewhat troublesome to operate.

SUMMARY OF THE INVENTION

The object of the present invention is to provide a hydraulic system for producing, without a troublesome operation, a half floating state to reduce the weight of a mower unit falling on gauge wheels.

The above object is fulfilled, according to the present invention, by a hydraulic system for controlling a mower unit through a raising and lowering mechanism, comprising:

a control lever having a control means for controlling the mower unit, the control means having a raising position for raising the mower unit, a lowering position for lowering the mower unit, and a neutral position for maintaining the mower unit still;

a hydraulic control valve assembly including a main control valve, an auxiliary control valve and a throttle valve connected in series between a hydraulic pressure source and the hydraulic cylinder, for selectively producing, in response to operation of the control lever, a raising state for supplying pressure oil to the hydraulic cylinder to raise the mower unit, a lowering state for draining pressure oil from the hydraulic cylinder to lower the mower unit by gravity, a neutral state for stopping supply and drainage of pressure oil to/from the hydraulic cylinder to maintain mower unit still, and a half floating state for supplying pressure oil to the hydraulic cylinder and draining pressure oil from the hydraulic cylinder through the throttle valve to apply to the mower unit a raising force less than a gravitational lowering force; and an interlock for controlling the auxiliary control valve in response to movement of the main control valve, such that the hydraulic control valve assembly produces the half floating state when the control means moves from the lowering position to the neutral position.

The hydraulic system having the above construction provides only three control positions, i.e. the raising position, lowering position and neutral position. However, through an operation to the neutral position, a selection is made between an ordinary neutral state for maintaining the mower unit still, and a half floating state for reducing the weight of the mower unit falling on the gauge wheels. In making the present invention, it has been noted that the half floating state is required for a grass cutting operation with the mower unit maintained in position after being lowered to the ground. Consequently, the interlock is provided which controls the auxiliary control valve in response to movement of the main control valve, such that the hydraulic control valve assembly produces the half floating state when the control means moves from the lowering position to the neutral position.

The present invention proposes a particular construction for fulfilling the above object, in which the main control valve is switchable among a raising position for connecting an oil line of the hydraulic cylinder to the hydraulic pressure source, a lowering position for connecting the oil line of the hydraulic cylinder to a drain tank, and a neutral position for connecting the oil line of the hydraulic cylinder to the hydraulic pressure source, and connecting the hydraulic pressure source to the drain tank through the throttle valve, the auxiliary control valve being switchable between a first position for shutting the oil line of the hydraulic cylinder, and a second position for opening the oil line of the hydraulic cylinder, the interlock maintaining the auxiliary control valve in the second position when the main control valve is switched from the lowering position to the neutral position.

In a preferred embodiment of the invention, the main control valve and the auxiliary control valve comprise rotary valves, and the interlock comprises a cam mechanism for interlocking rotational displacements of rotary spools of the main control valve and the auxiliary control valve. This construction promotes operability of the hydraulic system.

In a different embodiment of the invention, the main control valve and the auxiliary control valve comprise slide valves, and the interlock comprises an engaging mechanism for interlocking linear displacements of slide spools of the main control valve and the auxiliary control valve. With employment of the slide valves, the hydraulic system may be manufactured at low cost, based on easiness in shaping the valves and realizing compactness thereof.

Other features and advantages of the present invention will be apparent from the description of the preferred embodiments taken with reference to the drawings.

DETAILED DESCRIPTION OF THE PREFERRED EMBODIMENTS

Figure 1:
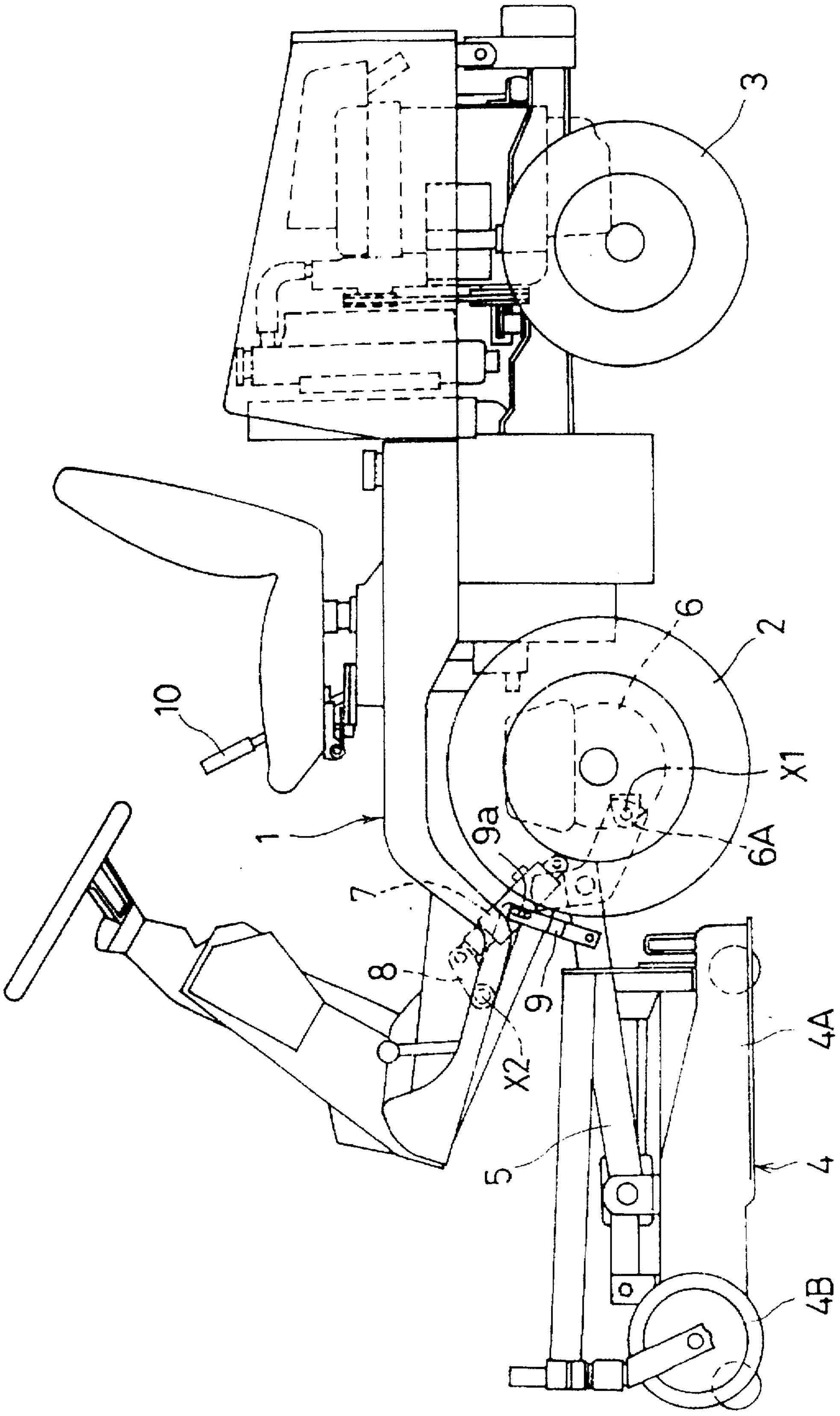
FIG. 1 is a side elevation of a front-mount type lawn tractor employing a hydraulic system according to the present invention.

FIG. 1 shows a front-mount type lawn tractor having a tractor body 1 with right and left front wheels 2 acting as drive wheels, and right and left rear wheels 3 acting as dirigible wheels. A mower unit 4 is vertically movably connected to the front of the tractor body 1.

The mower unit 4 includes a housing 4A enclosing a plurality of cutting blades (not shown) driven by vertical shafts, and right and left gauge wheels 4B attached to front positions of the housing 4A. The mower unit 4 is connected to a free end of a lift link 5 extending from the front of the tractor body 1 and forming part of a raising and lowering mechanism. The lift link 5 is connected to a boss 6A fixed to a transmission case 6 to be vertically pivotable about an axis X1, and suspended through a link 9 from a lift arm 8 pivotable about an axis X2 by extension and contraction of a hydraulically operable single-acting lift cylinder 7. Thus, the mower unit 4 is raised and lowered about the axis X1 by extension and contraction of the lift cylinder 7. A connection between the lift arm 8 and link 9 defines a slot 9*a* for allowing the mower unit 4 to follow quickly ups and downs of the ground.

Figure 2:
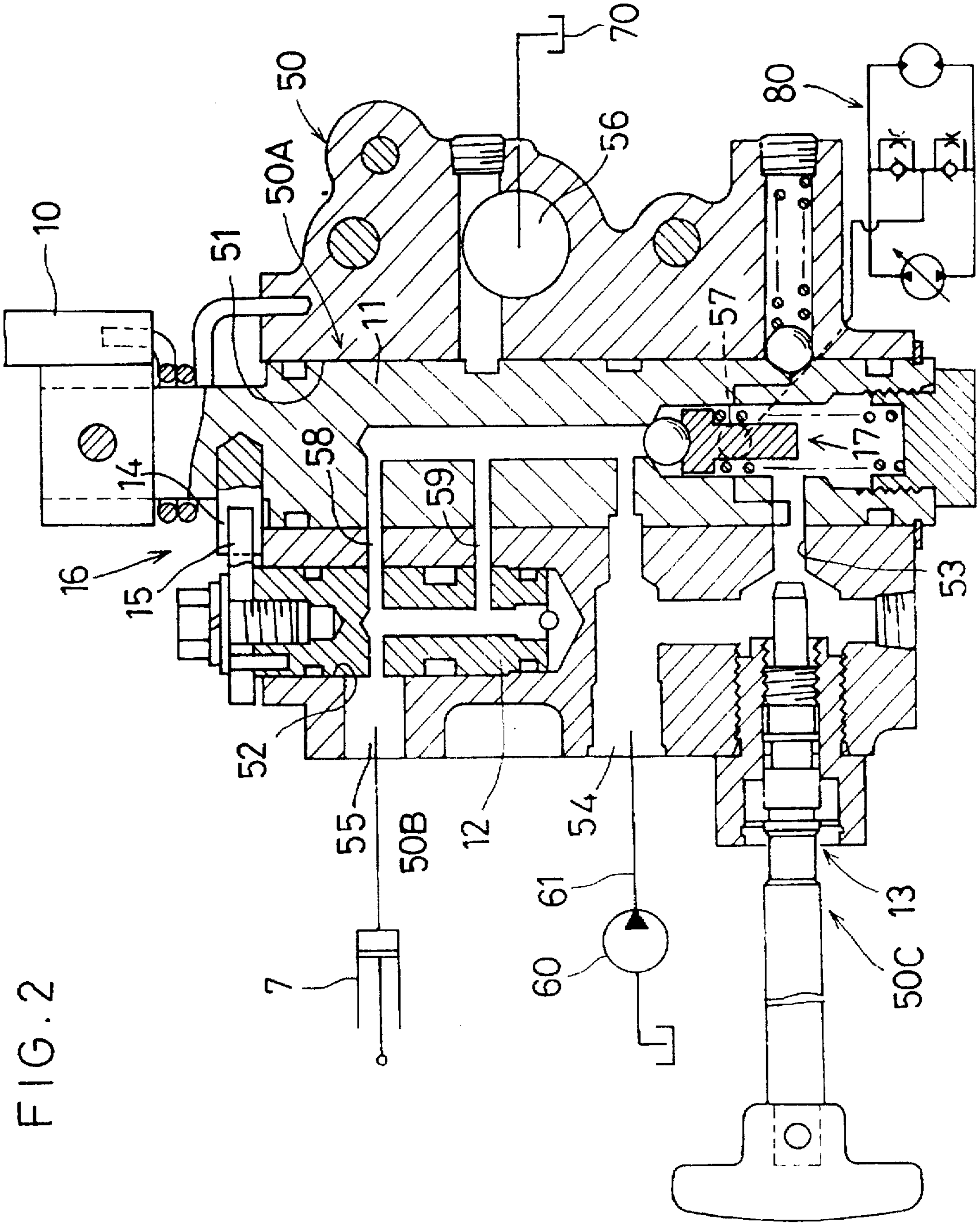
FIG. 2 is a sectional view of a valve unit.

The extension and contraction of the lift cylinder 7 are achieved by switching states of pressure oil flow to and from the lift cylinder 7. The flowing states of pressure oil to and from the lift cylinder 7 are switchable by operating a lift control lever 10 disposed in a driver's section on the tractor body 1. As shown in FIG. 2, a valve unit 50 is mounted on an oil line 61 extending between the lift cylinder 7 and a hydraulic pump 60, to act as a hydraulic control valve device. The valve unit 50 includes a main control valve 50A and an auxiliary control valve 50B switchable by operation of the control lever 10.

Details of the valve unit 50 will be described next. The main control valve 50A is a rotary valve having three positions, i.e. raising, neutral and lowering positions. The auxiliary control valve 50B is a rotary valve having two positions. The valve unit 50 also includes an adjustable throttle valve 50C. The main control valve 50A has oil flowing directions switchable by rotation of a rotary spool 11 rotatable in a main bore 51 formed in a body of the valve unit 50. The auxiliary control valve 50B has oil flowing directions switchable by rotation of a rotary spool 12 rotatable in an auxiliary bore 52 formed in the body of the valve unit 50. The throttle valve 50C has a flow rate therethrough adjustable by positions of a needle spool 13 entering a throttling bore 53 formed in the body of the valve unit 50.

The rotary spool 11 of the main control valve 50A is operable by the lever 10. The rotary spool 12 of the auxiliary control valve 50B is operable through a cam mechanism 16 including a pin 14 formed on the rotary spool 11 of the main control valve 50A and a cam plate 15 formed on the rotary spool 12 of the auxiliary control valve 50B. The main control valve 50A has a relief valve 17 mounted therein. The body of the valve unit 50 further includes a pump port 54, a cylinder port 55 communicating with the lift cylinder 7, a tank port 56, and a port 57 communicating with a hydrostatic stepless transmission 80.

Figure 8A:
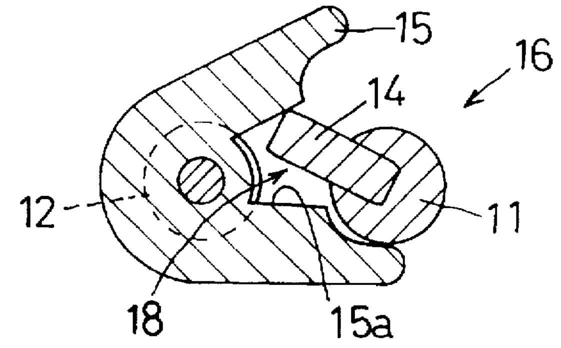
FIGS. 8A through 8D are explanatory views showing switching between power steering and manual steering.
Figure 8B:
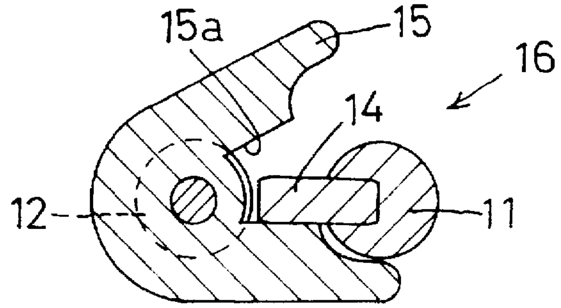
Figure 8C:
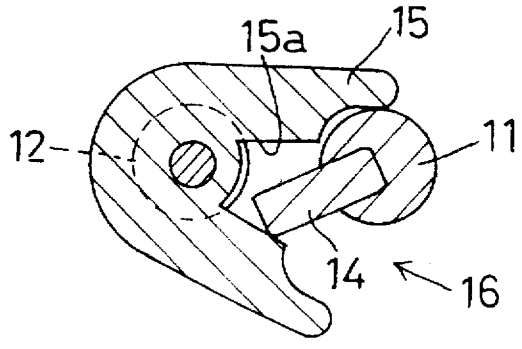
Figure 8D:
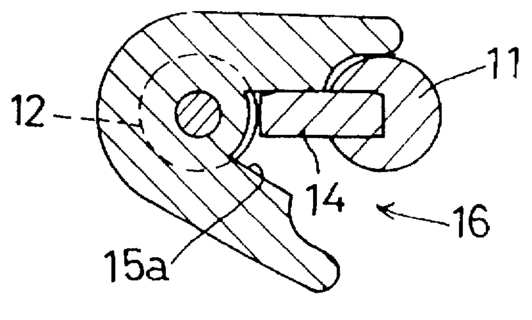

As seen from FIG. 8A, the cam mechanism 16 interlocking the rotary spool 11 of the main control valve 50A and the rotary spool 12 of the auxiliary control valve 50B has a wide engaging recess 15*a* for the cam plate 15 to engage the pin 14. This recess 15*a* defines an accommodating space (free space) 18 for establishing a half raising state with a neutralizing operation carried out after once allowing the mower unit 4 to lower by gravity into contact with the ground.

Figure 3:
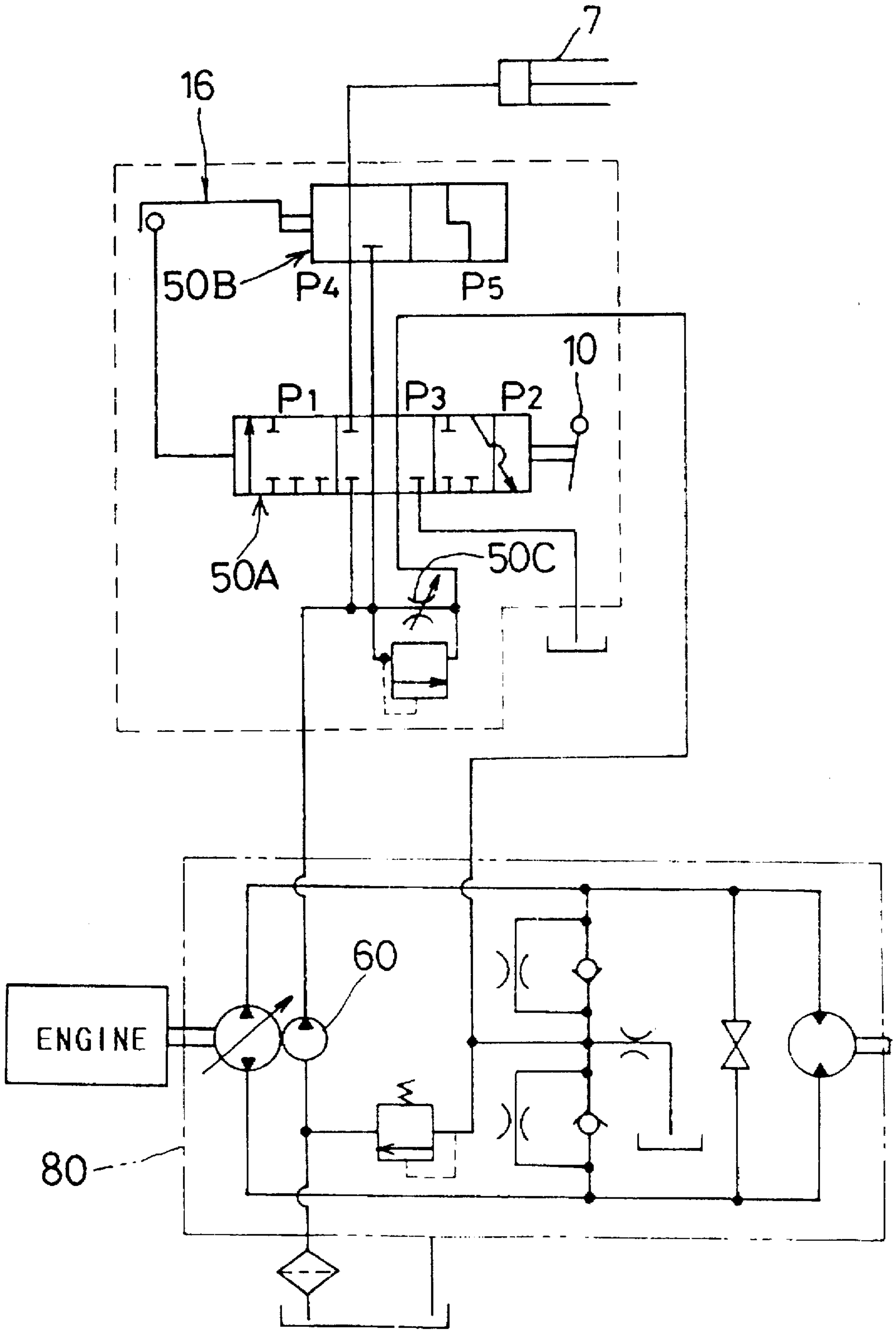
FIG. 3 is a hydraulic circuit diagram.

The pressure oil flow to and from the lift cylinder 7 will be described next with reference to the hydraulic circuit diagram shown in FIG. 3.

In this riding lawn tractor, oil is supplied to the lift cylinder 7 from a charge pump 60 of the hydrostatic stepless transmission 80.

As seen, the main control valve 50A is switchable among three positions, i.e. a supply position P1 for supplying pressure oil from the hydraulic pump 60 to the lift cylinder 7, a drain position P2 for draining pressure oil from the lift cylinder 7 to an oil tank 70, and a neutral position P3 for stopping supply and drainage of pressure oil to/from the lift cylinder 7. The auxiliary control valve 50B is switchable between two positions, i.e. a supply position P4 for supplying pressure oil to the lift cylinder 7, and a drain position P5 for draining pressure oil from the lift cylinder 7.

When the lift control lever 10 is in a neutral position, the main control valve 50A is in the neutral position P3, and the auxiliary control valve 50B in the supply position P4. This provides a neutral state in which the pressure oil is not supplied to the lift cylinder 7 or drained therefrom, to stop vertical movement of the mower unit 4. Consequently, the mower unit 4 is maintained at a desired height. In this state, the pressure oil from the hydraulic pump 60 is supplied through the throttle valve 50C to the hydrostatic stepless transmission 80 as charge oil.

The lift control lever 10 is operable to switch the main control valve 50A to the supply position P1. Then, the pressure oil flow to the lift cylinder 7 becomes a raising state in which pressure oil is supplied from the hydraulic pump 60 to the lift cylinder 7 to raise the mower unit 4. Consequently, the mower unit 4 may be raised to a desired height.

When the lift control lever 10 is operated to switch the main control valve 50A to the drain position P2, and the auxiliary control valve 50B to the drain position P5, the pressure oil flow becomes a free lowering state in which the pressure oil is drained from the lift cylinder 7 to the oil tank 70 to lower the mower unit 4. Thus, the mower unit 4 may be lowered to a desired height. The pressure oil from the hydraulic pump 60 is supplied through the throttle valve 50C to the hydrostatic stepless transmission 80 as charge oil. In a grass cutting operation in the free lowering state, the mower unit 4 is maintained at the desired height, and in a half floating state following ups and downs of the ground, with the gauge wheels 4B of the mower unit 4 contacting the ground under the weight of the mower unit 4. In this way, grass may be cut uniformly at a desired height.

When, in the free lowering state of the mower unit 4, the lift control lever 10 is operated to switch the main control valve 50A from the drain position P2 to the neutral position P3, the lift cylinder 7 communicates with the hydraulic pump 60 and also with the hydrostatic stepless transmission 80 through the throttle valve 50C. As a result, the pressure oil flows through the throttle valve 50C to produce a back pressure. The pressure oil flow for the lift cylinder 7 provides a half floating state to apply to the mower unit 4 a raising force less than the weight of the mower unit 4, thereby reducing the weight of the mower unit 4 falling on the gauge wheels 4B, without lifting the gauge wheels 4B.

Figure 4:
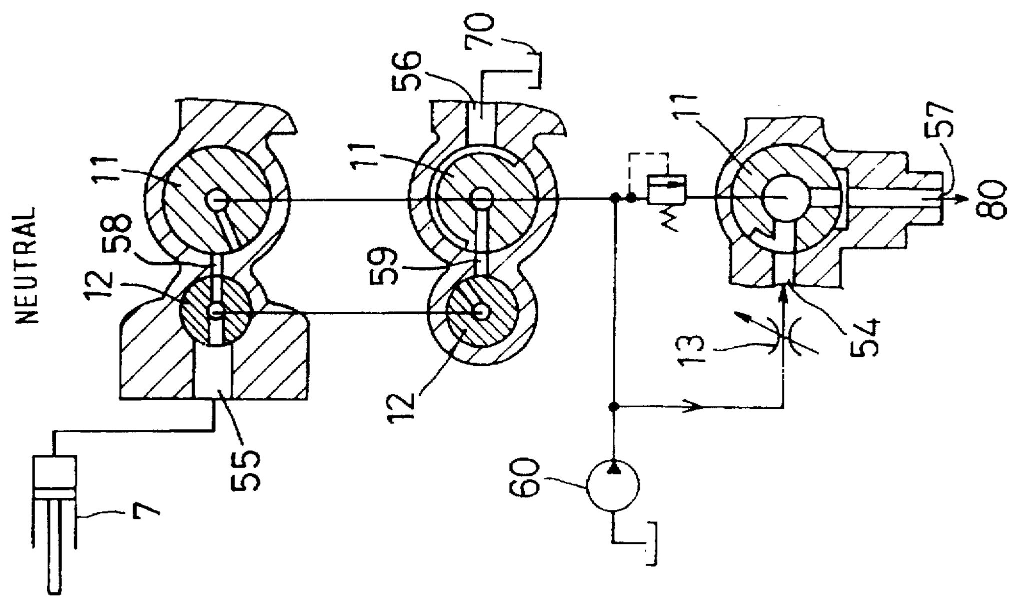
FIG. 4 is a functional view of a valve in a neutral position.
Figure 5:
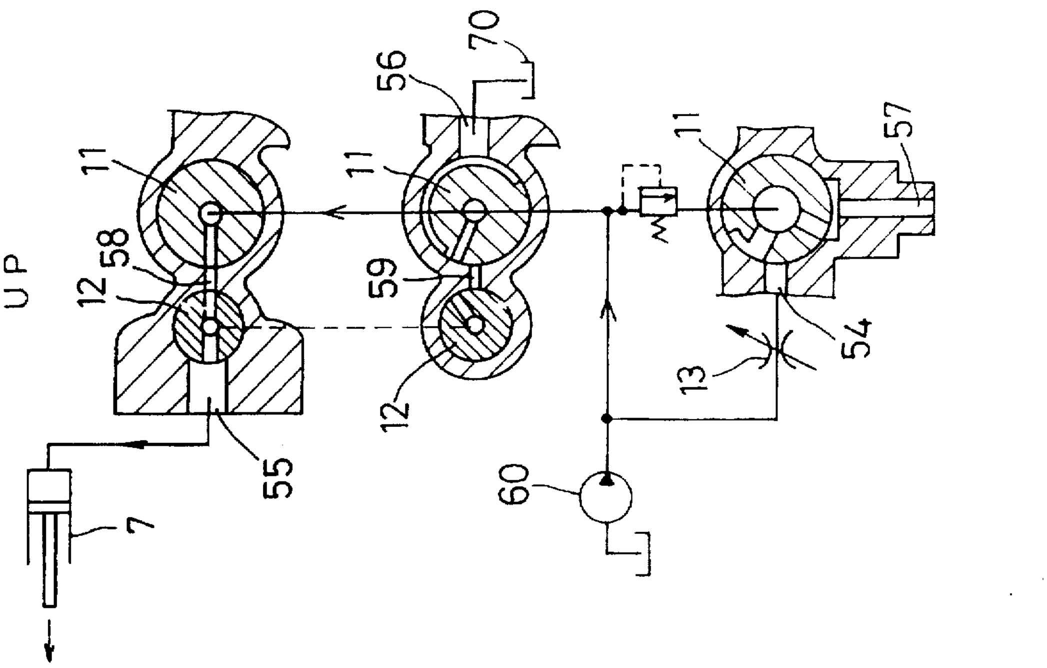
FIG. 5 is a functional view of the valve in a raising position.

How the hydraulic system in this embodiment produces the neutral state, raising state, lowering state and half floating state, will particularly be described with reference to FIGS. 4 through FIGS. 8A–D. FIG. 4 shows the neutral state for stopping vertical movement of the mower unit 4. FIG. 5 shows the raising state, FIG. 6 the lowering state, and FIG. 7 the half floating state.

When the lever 10 is operated to switch the rotary spool 11 of the main control valve 50A from the neutral position shown in FIG. 4 to the raising position shown in FIG. 5, the rotary spool 12 of the auxiliary control valve 50B remains in the current position because of the accommodating space 18 of the cam mechanism. Thus, pressure oil is supplied from the pump 60 to the lift cylinder 7 through the main control valve 50A, communicating passage 58 and auxiliary control valve 50B.

Figure 6:
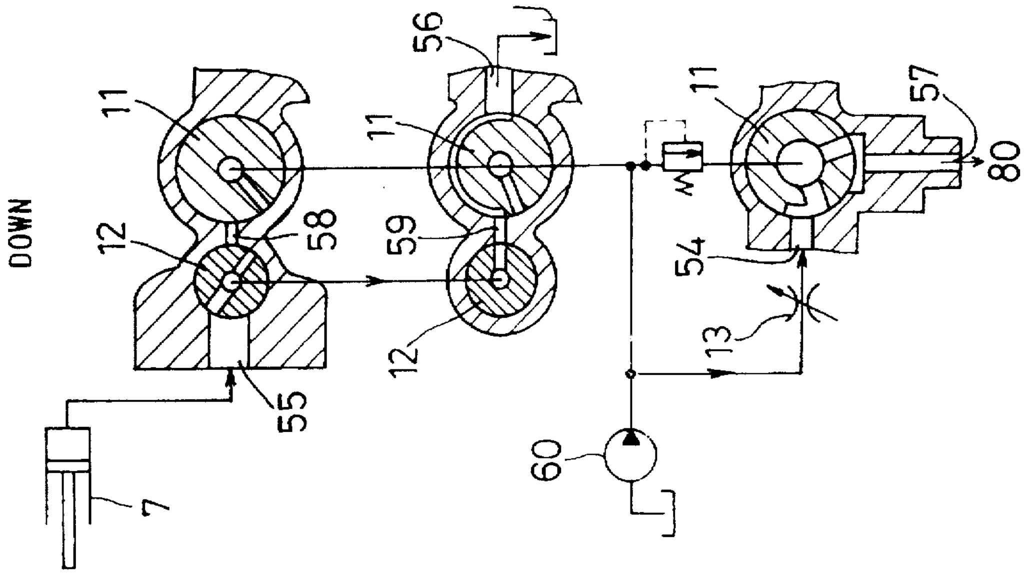
FIG. 6 is a functional view of the valve in a lowering position.

When the rotary spool 11 of the main control valve 50A is switched from the neutral position shown in FIG. 4 to the free lowering position shown in FIG. 6, the rotary spool 11 of the auxiliary control valve 50B is operated through the cam mechanism 16. Thus, pressure oil is drained from the lift cylinder 7 to the oil tank 70 through the auxiliary control valve 50B, communicating passage 59 and main control valve 50A.

Figure 7:
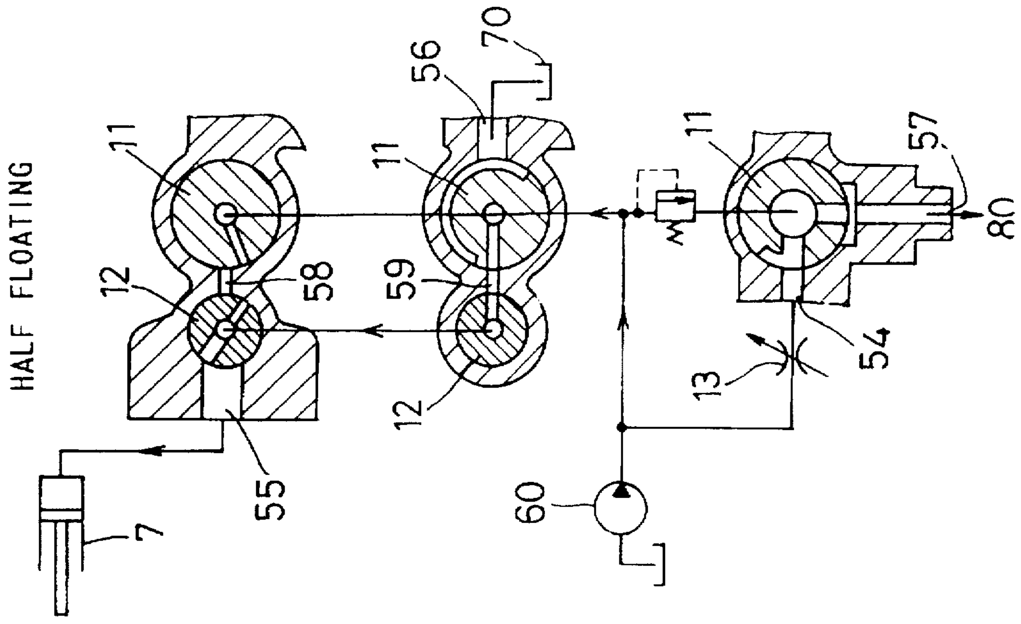
FIG. 7 is a functional view of the valve in a half raising position.

When the rotary spool 11 of the main control valve 50A is switched from the free lowering position shown in FIG. 6 to the half floating position shown in FIG. 7, the rotary spool 12 of the auxiliary control valve 50B remains inoperative because of the accommodating space 18 of the cam mechanism 16. Thus, pressure oil is supplied from the pump 60 to the lift cylinder 7 through the main control valve 50A, communicating passage 58 and auxiliary control valve 50B, and charge oil is supplied also to the hydrostatic stepless transmission 80 through the throttle valve 50C. The throttle valve 50C applies a back pressure to the lift cylinder 7 to produce the half floating state.

That is, when the lever 10 is operated to the neutral position after allowing the mower unit 4 to lower freely, pressure oil is supplied from the hydraulic pump 60 to the lift cylinder 7 and hydrostatic stepless transmission 80. With the pressure oil flowing through the throttle valve 50C disposed between the hydraulic pump 60 and hydrostatic stepless transmission 80, a back pressure is applied to the lift cylinder 7 to increase an internal pressure of the lift cylinder 7 and to apply to the mower unit 4 a raising force less than the weight of the mower unit 4. Consequently, the weight of the mower unit 4 falling on the gauge wheels 4B may be reduced according to a throttling amount of the throttle valve 50C. Since the raising force produced by the back pressure due to the throttling is less than the weight of the mower unit 4, the mower unit 4 will lower by gravity against the raising force to follow any dents of the ground. That is, by placing the pressure oil flow for the lift cylinder 7 in the half floating state, the weight of the mower unit 4 falling on the gauge wheels 4B is reduced to an extent of not lifting the gauge wheels 4B. As a result, damage to lawn is checked.

Figure 9:
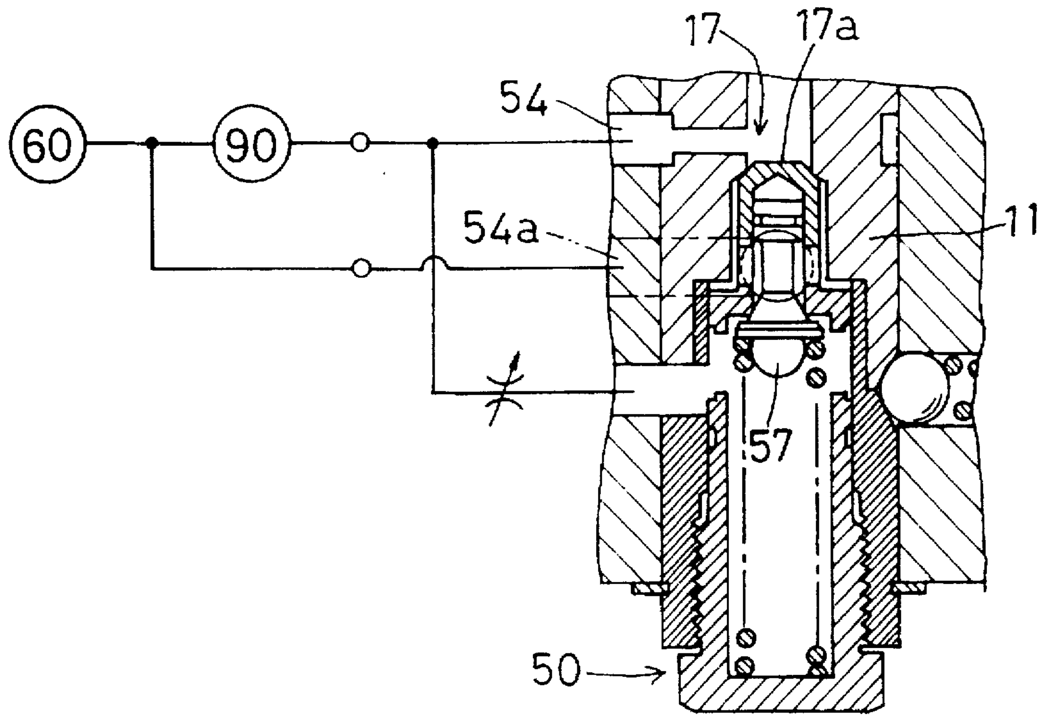
FIG. 9 is a fragmentary sectional view of a valve unit in a further embodiment of the invention.
Figure 10:
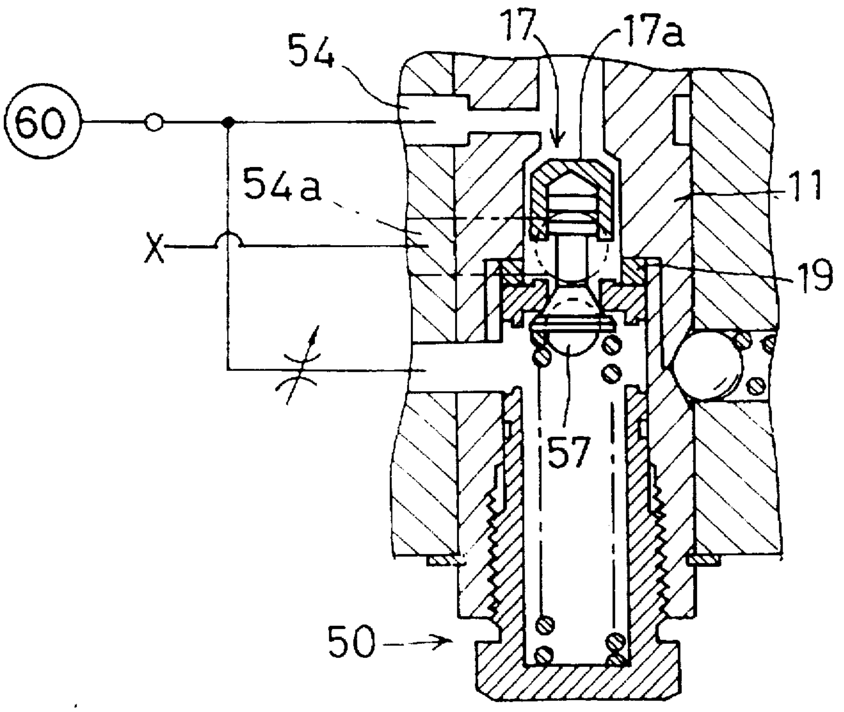
FIG. 10 is a sectional view showing switching of a relief valve in the further embodiment.
Figure 11:
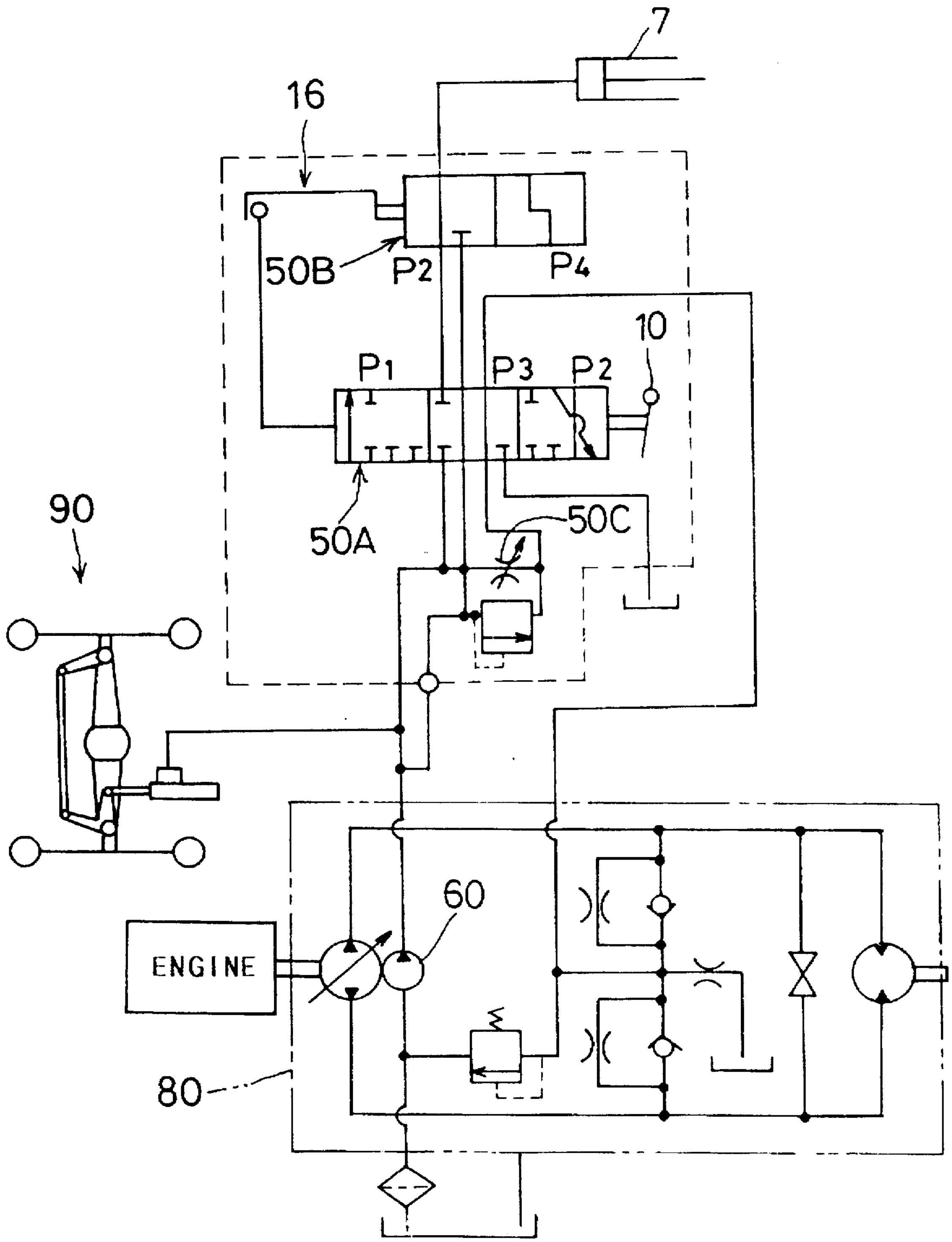
FIG. 11 is a circuit diagram of the further embodiment where the valve unit is used as a power steering unit.

FIGS. 9 through 11 show a modification of the above embodiment. The hydraulic system in this modification is applicable to a riding lawn tractor employing power steering. Oil from the charge pump 60 of the hydrostatic stepless transmission 80 may be supplied to a power steering device 90 as well as the lift cylinder 7.

This modification is different from the foregoing embodiment in that the relief valve 17 of the valve unit 50 is changed from the ball type to the poppet type, and that a connecting port 54*a* is provided to communicate the relief valve 17 with the pump 60 for allowing the relief valve 17 to be shared by the power steering device 90 and lift cylinder 7. The other details remain unchanged.

When the power steering device 90 is used, a holder 17*a* of the relief valve 17 is screwed in to close a passage present forwardly thereof. As a result, the operating pressure of the power steering device 90 is applied to the relief valve 17 through the connecting port 54*a*.

Figure 12:
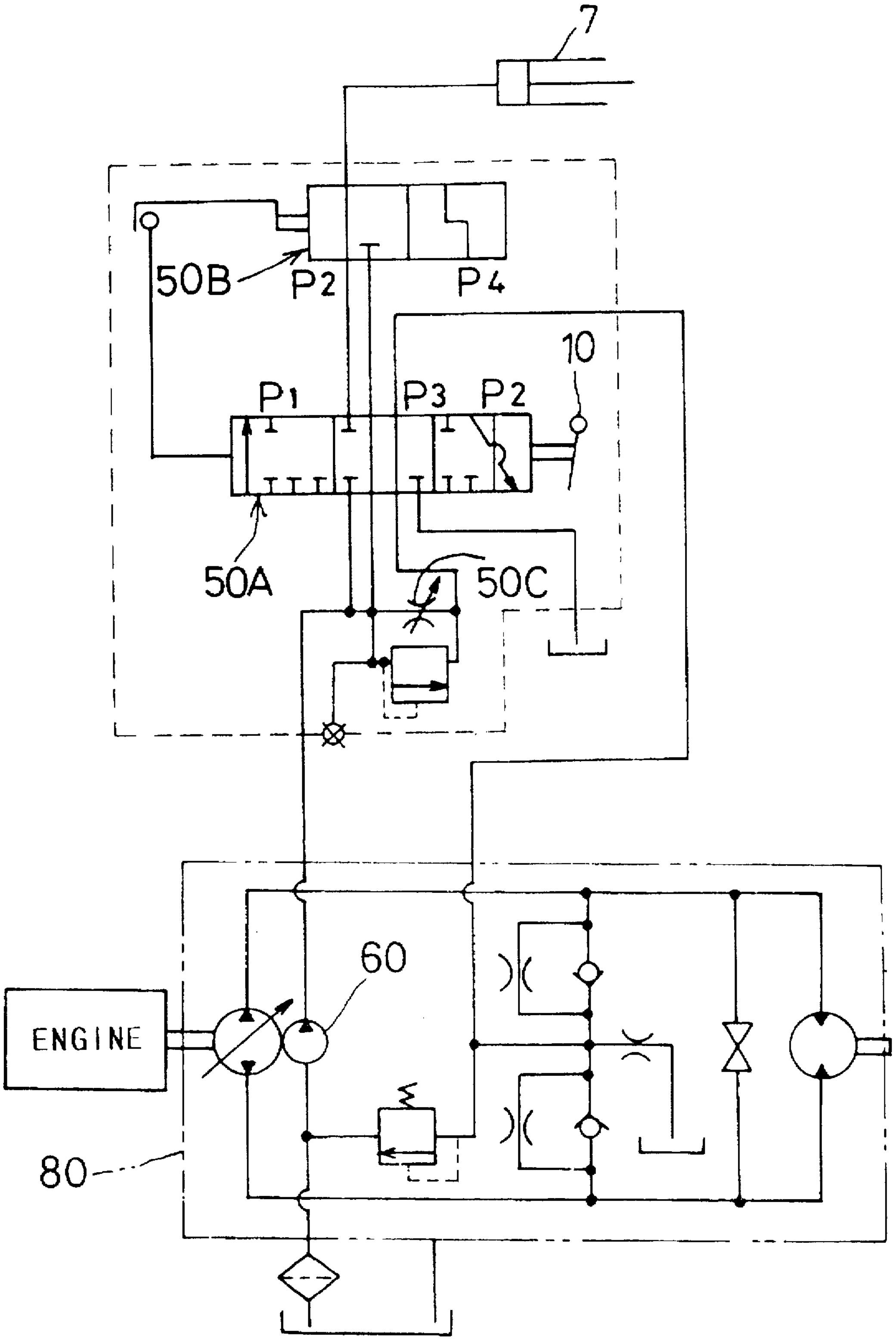
FIG. 12 is a circuit diagram showing the relief valve of FIG. 9 used on a manually steered vehicle.

This construction of relief valve 17 is applicable also to a vehicle not employing a power steering device. In this case, a plug is screwed into the connecting port 54*a* to close the oil line leading to the relief valve 17. The length of a collar 19 interposed between the main control valve 50A and relief valve 17 is varied to reduce a relief pressure. FIG. 12 shows a hydraulic circuit incorporating the above change.

[Different Embodiment]

A hydraulic system in which a main control valve and an auxiliary control valve are formed as linear slide valves will be described next.

As shown in FIGS. 13 through 18, a valve unit 150 includes a spool type main control valve 150A having three positions, i.e. raising, neutral and lowering positions, a spool type auxiliary control valve 150B having two positions, and an adjustable throttle valve 150C. The main control valve 150A has oil flowing directions switchable by movement of a slide spool 111 linearly slidable in a main bore 151 formed in a body of the valve unit 150. The auxiliary control valve 150B has oil flowing directions switchable by movement of a slide spool 112 linearly slidable in an auxiliary bore 152 formed in the body of the valve unit 150. The throttle valve 150C has a flow rate therethrough adjustable by positions of a needle spool 113 entering a throttling bore 153 formed in the body of the valve unit 150.

The spool 111 of the main control valve 150A is operable by the lift control lever 10. The spool 112 of the auxiliary control valve 150B is operable with movement of the spool 111 of the main control valve 150A.

A relief valve 117 and a throttle valve 113 are formed in the valve body. The valve body further includes a pump port 154 communicating with a charge pump (which is one example of hydraulic pumps) 60 of the hydrostatic stepless transmission 80, a cylinder port 155 communicating with the lift cylinder 7, a tank port 171 communicating with the oil tank 70, and a return port 157 communicating with a drain oil line connected to a charge circuit of the hydrostatic stepless transmission 80.

Figure 18:
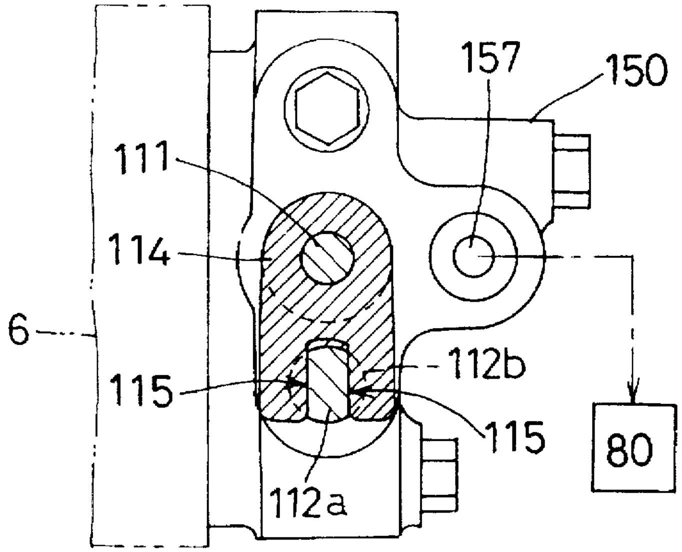
FIG. 18 is a front view of an interlock mechanism.

As shown in FIG. 18, a control plate 114 having an approximately inverted U-shape is attached to a projecting end of the spool 111 of the main control valve 150A. The control plate 114 is relatively slidably fitted on an accommodating cut portion 115 having a track-shaped section and formed between a projecting end 112*a* and a shank 112*b* of the spool 112 of the auxiliary control valve 150B. The accommodating cut portion 115 has a span equal to a distance required for switching control positions of the spool 111 of the main control valve 150A. The cut portion 115 is movable relative to the control plate 114 within this span. The above construction provides an engaging mechanism 116 for enabling a one-way contact between the spool 111 of the main control valve 150A and the spool 112 of the auxiliary control valve 150B.

Figure 13:
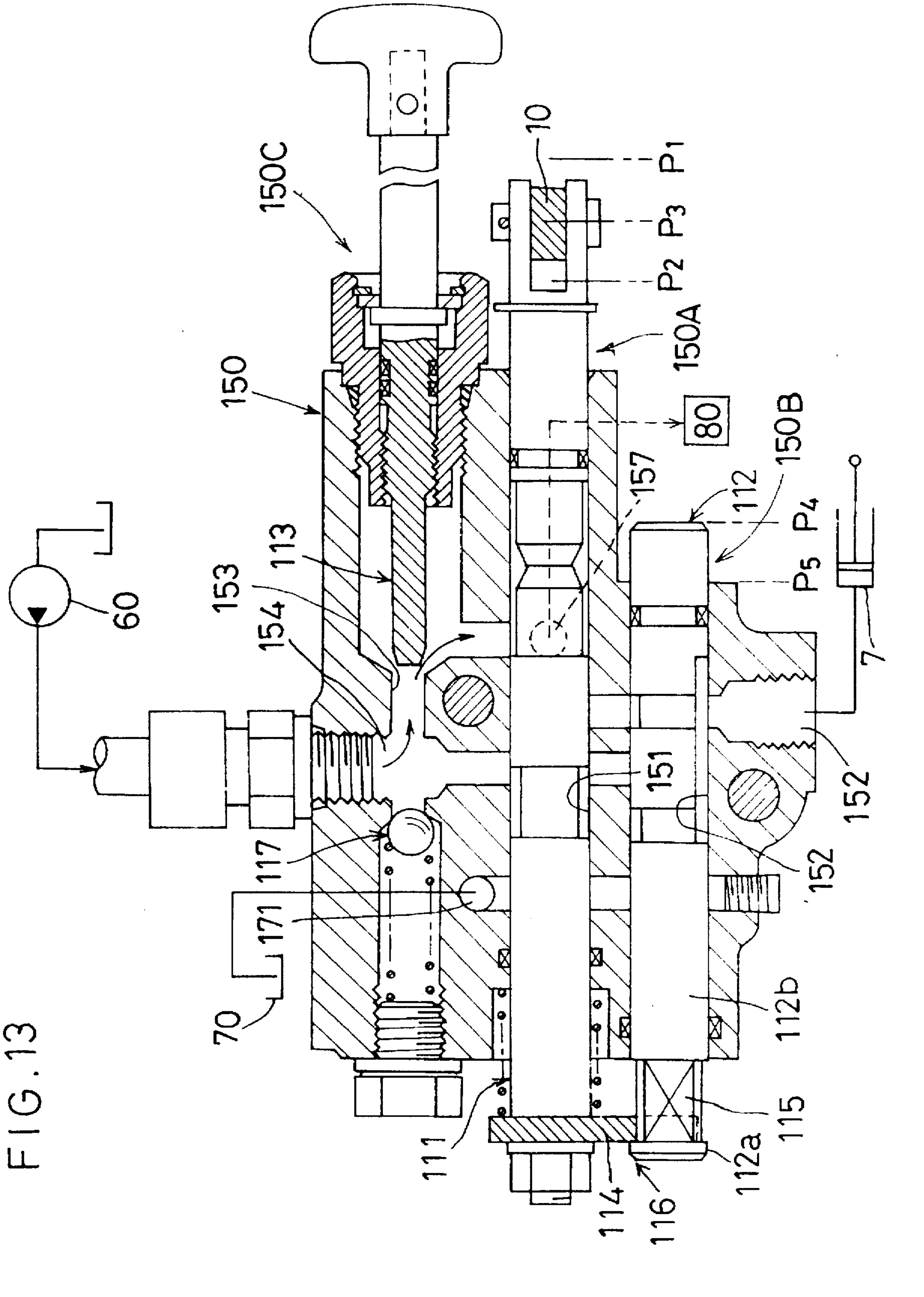
FIG. 13 is a sectional view of a valve unit in a neutral position in a different embodiment of the invention.

When the spool 111 of the main control valve 150A is moved leftward from the neutral position shown in FIG. 13 toward a drain position P2, the spool 121 of the auxiliary control valve 150B also is moved leftward. When the spool 111 of the main control valve 150A is moved from the drain position P2 toward neutral position P3, the control plate 114 moves past the accommodating cut portion 115, allowing the spool 112 to remain still. As a result, the auxiliary control valve 150B maintains a drain position P5.

When the spool 111 of the main control valve 50A is moved rightward from the neutral position P3, with the auxiliary control valve 150B lying in a drain position P4, the control plate 114 contacts the spool shank 112*b* of the auxiliary control valve 150B to move the spool 112. Thus, when the main control valve 150A moves to the supply position P1, the auxiliary control valve 150B also is operated to supply position P4.

The pressure oil flow to and from the lift cylinder 7 will be described next with reference to the hydraulic circuit diagram shown in FIG. 17.

In this riding lawn tractor, oil is supplied to the lift cylinder 7 from the charge pump 60 of the hydrostatic stepless transmission 80. No pump is provided exclusively for oil supplying purposes.

Figure 17:
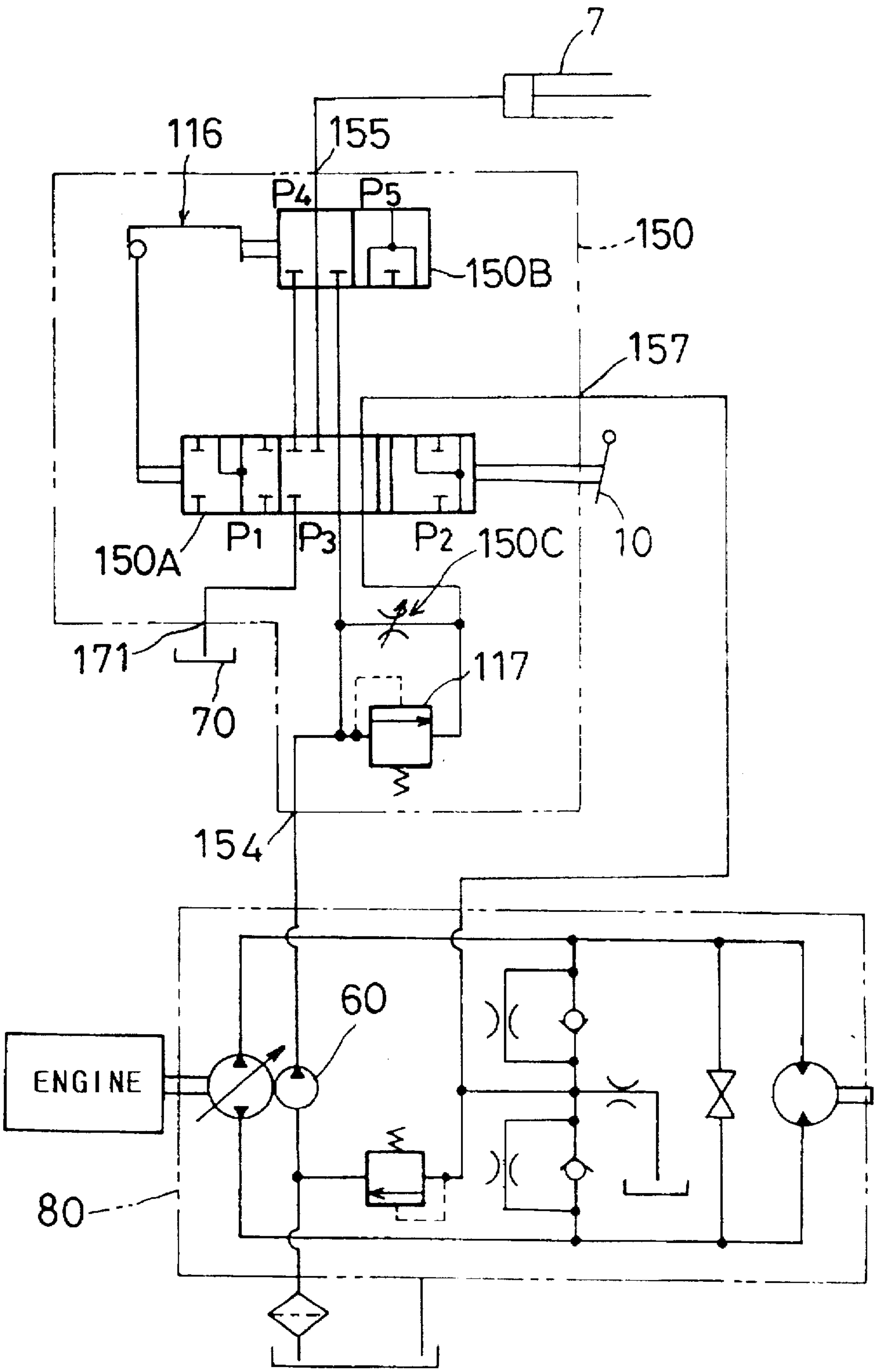
FIG. 17 is a circuit diagram illustrating the different embodiment.

As shown in FIG. 17, the main control valve 150A is switchable among three positions, i.e. the supply position P1 for supplying pressure oil from the charge pump 60 to the lift cylinder 7, the drain position P2 for draining pressure oil from the lift cylinder 7 to the oil tank 70, and the neutral position P3 for stopping supply and drainage of pressure oil to/from the lift cylinder 7. The auxiliary control valve 150B is switchable between two positions, i.e. the supply position P4 for supplying pressure oil to the lift cylinder 7, and the drain position P5 for draining pressure oil from the lift cylinder 7.

When the lift control lever 10 is in the neutral position, the slide spool 111 of the main control valve 150A is in the neutral position P3, and the slide spool 111 of the auxiliary control valve 150B in the supply position P4 (FIGS. 13 and 17). This provides a neutral state in which the pressure oil is not supplied to the lift cylinder 7 or drained therefrom, to stop vertical movement of the mower unit 4. Consequently, the mower unit 4 is maintained at a desired height.

The pressure oil from the hydraulic pump 60 is supplied through the throttle valve 150C to the charge circuit of the hydrostatic stepless transmission 80 as charge oil.

Figure 14:
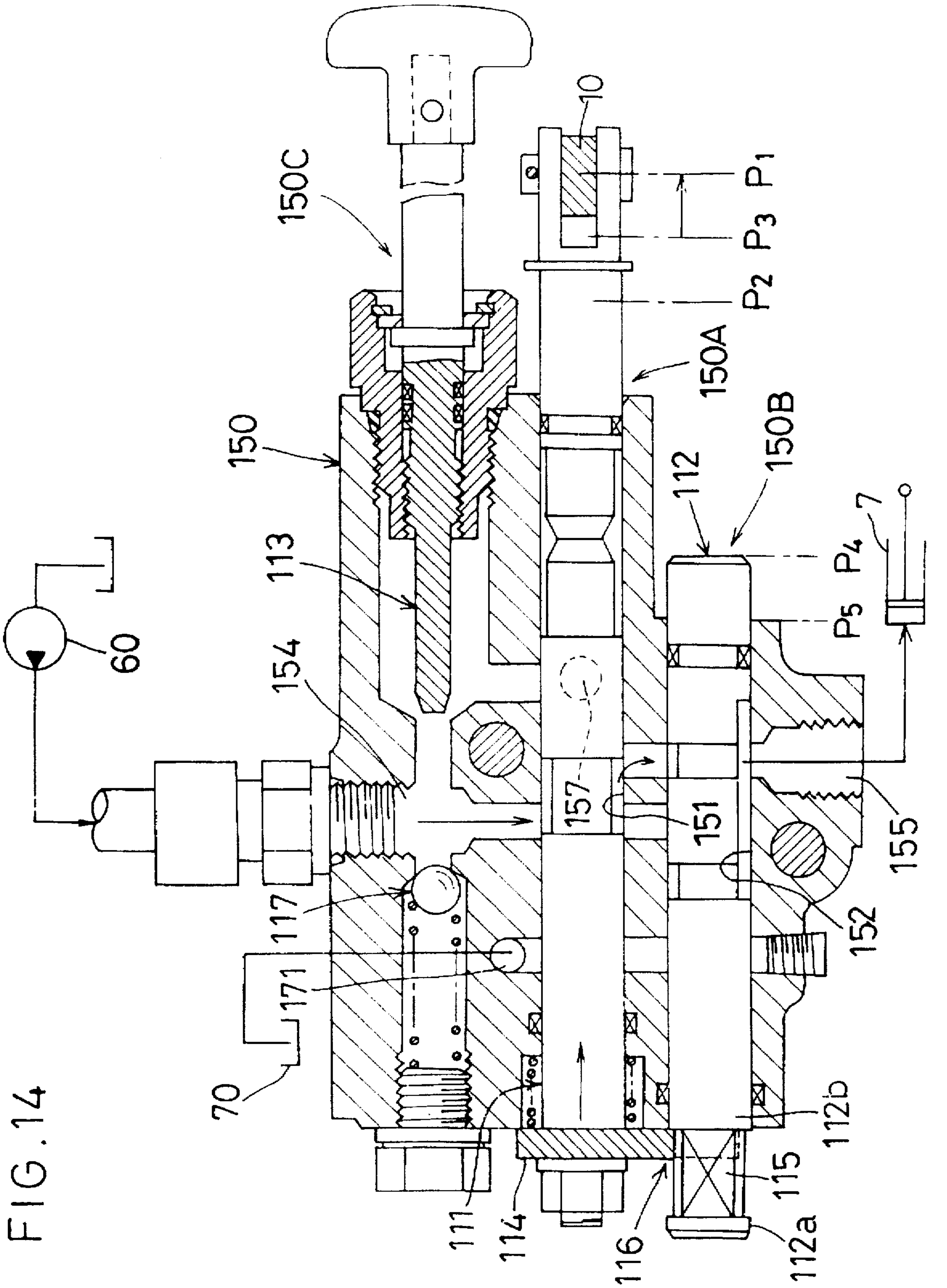
FIG. 14 is a sectional view of the valve unit of FIG. 13 in a raising position.

When the lift control lever 10 is operated to a raising position, the slide spool 111 of the main control valve 150A is moved to the supply position P1. However, the spool 112 is immovable by the action of the engaging mechanism 160, whereby the auxiliary control valve 150B remains in the supply position P4. Then, as shown in FIG. 14, the pressure oil is supplied from the charge pump 60 to the lift cylinder 7 which becomes a raising state to raise the mower unit 4. Thus, the mower unit 4 may be raised to a desired height. In this state, the pressure oil supply to the hydrostatic stepless transmission 80 is suspended, and the mower unit 4 is raised quickly.

Figure 15:
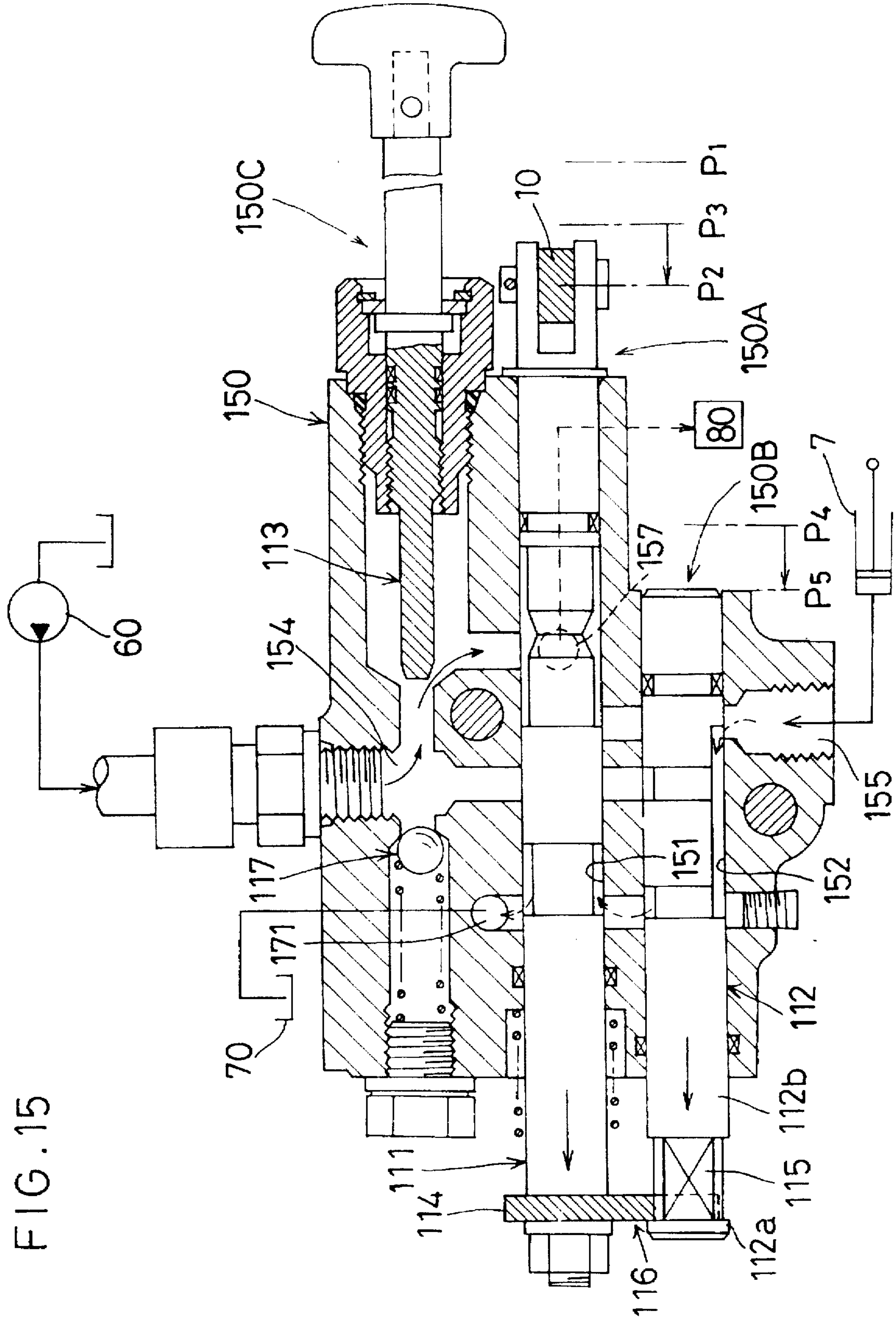
FIG. 15 is a sectional view of the valve unit of FIG. 13 in a lowering position.

When the lift control lever 10 is operated to a lowering position, the slide spool 111 of the main control valve 150A is moved to the drain position P2. The spool 112 is moved together by the action of the engaging mechanism 160. As a result, the auxiliary control valve 150B is switched to the drain position P5. Then, as shown in FIG. 15, the cylinder port 155 and tank port 171 communicate with both control valves 150A and 150B to drain the pressure oil from the lift cylinder 7. Thus, the mower unit 4 may be lowered by gravity to a desired height.

At this time, the pressure oil from the charge pump 60 is supplied through the throttle valve 113 to the charge circuit. In a grass cutting operation in the lowering state, the mower unit 4 is maintained at the desired height, following ups and downs of the ground, with the gauge wheels 4B of the mower unit 4 contacting the ground under the weight of the mower unit 4. In this way, grass may be cut uniformly at a desired height.

Figure 16:
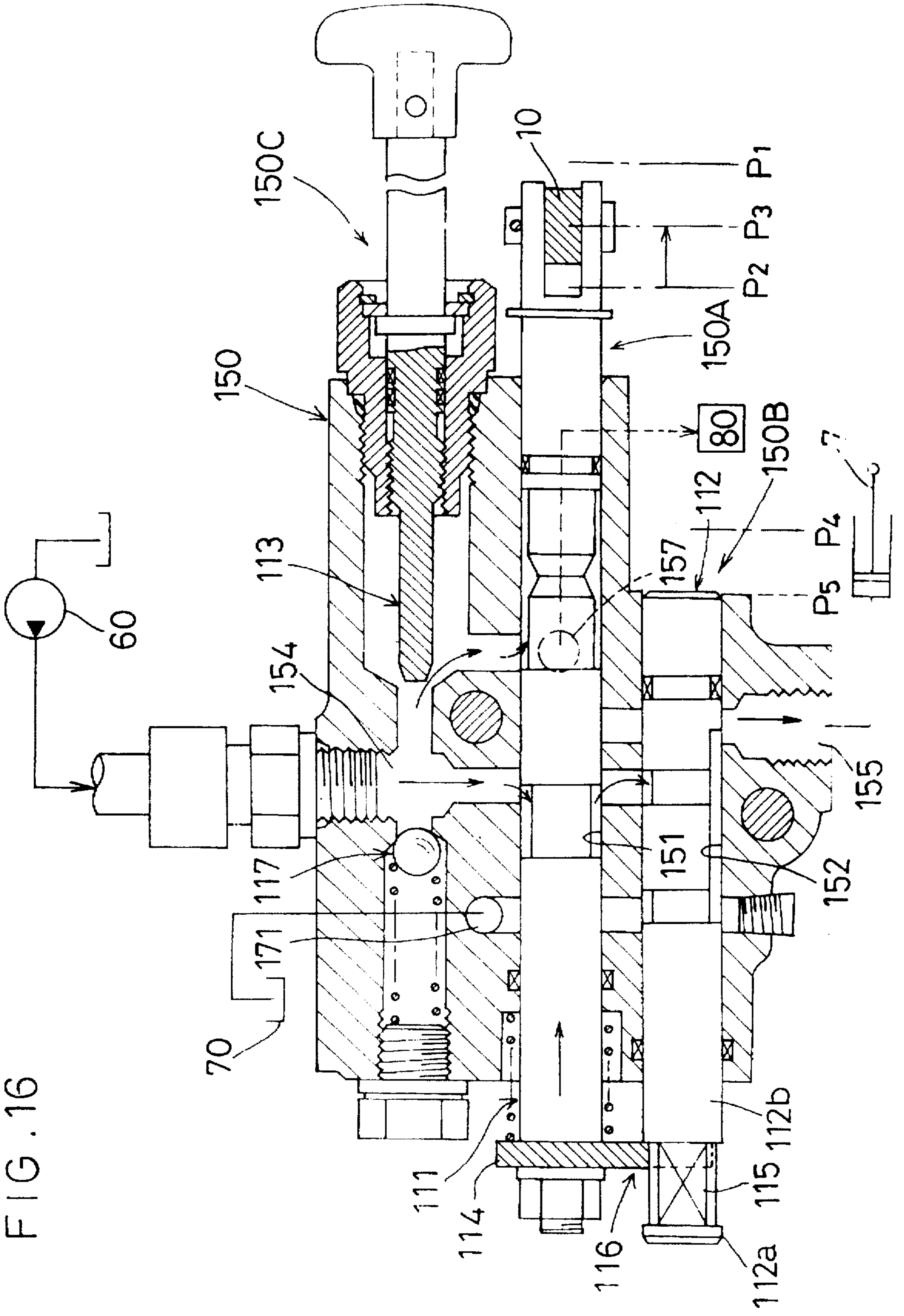
FIG. 16 is a sectional view of the valve unit of FIG. 13 in a half raising position.

When, in the lowering state of the mower unit 4, the lift control lever 10 is operated from the lowering position to the raising position to switch the main control valve 150A from the drain position P2 to the neutral position P3, the auxiliary control valve 150B is maintained, by the action of the engaging mechanism 160, in the drain position P5 as shown in FIG. 16. Then, the lift cylinder 7 communicates with the charge pump 60 which communicates also with the charge circuit through the throttle valve 113. As a result, the throttle valve 113 applies a back pressure to the lift cylinder 7, thereby to provide a half floating state to apply to the mower unit 4 a raising force less than the weight of the mower unit 4. Thus, the weight of the mower unit 4 falling on the gauge wheels 4B is reduced without lifting the gauge wheels 4B.

This provides the advantages of checking damage to lawn, and applying the weight taken off the gauge wheels 4B to the front wheels 2 to increase a vehicle propelling force.

Figure 19:
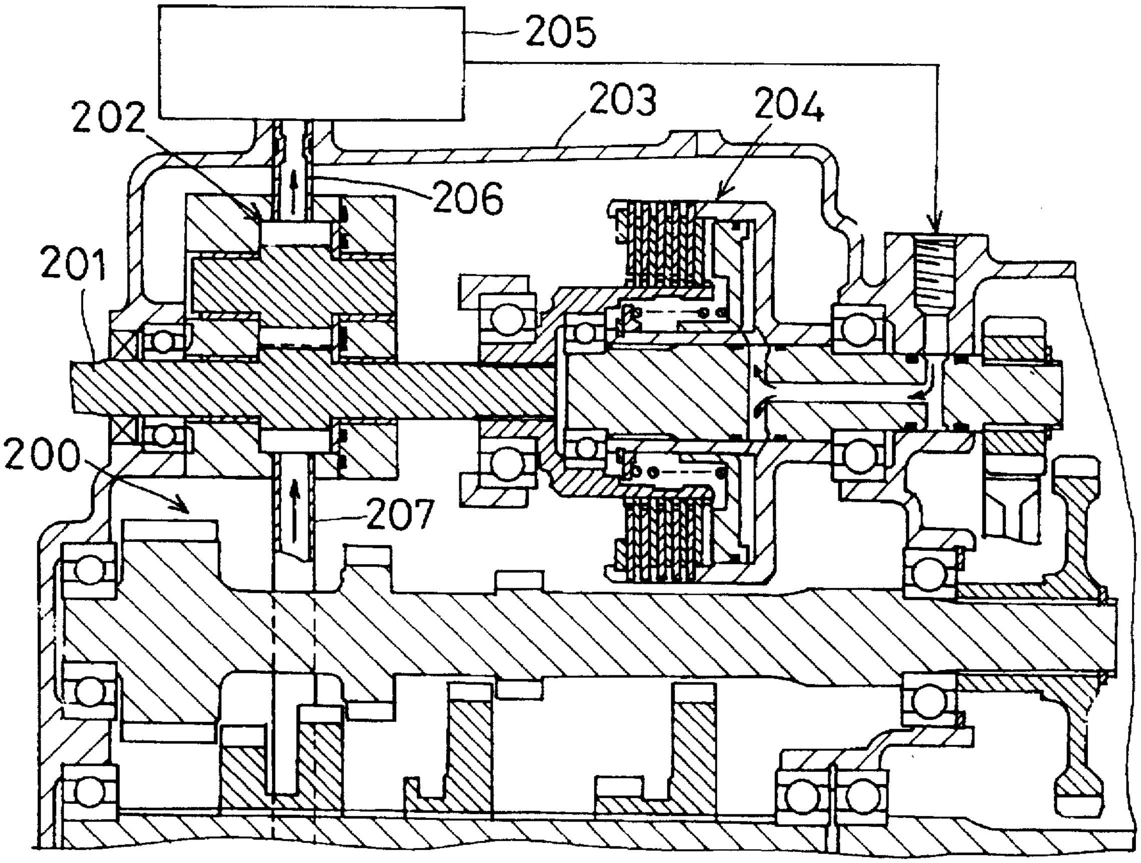
FIG. 19 is a sectional view of a transmission showing an arrangement of a gear pump for operating a valve mechanism.
Figure 20:
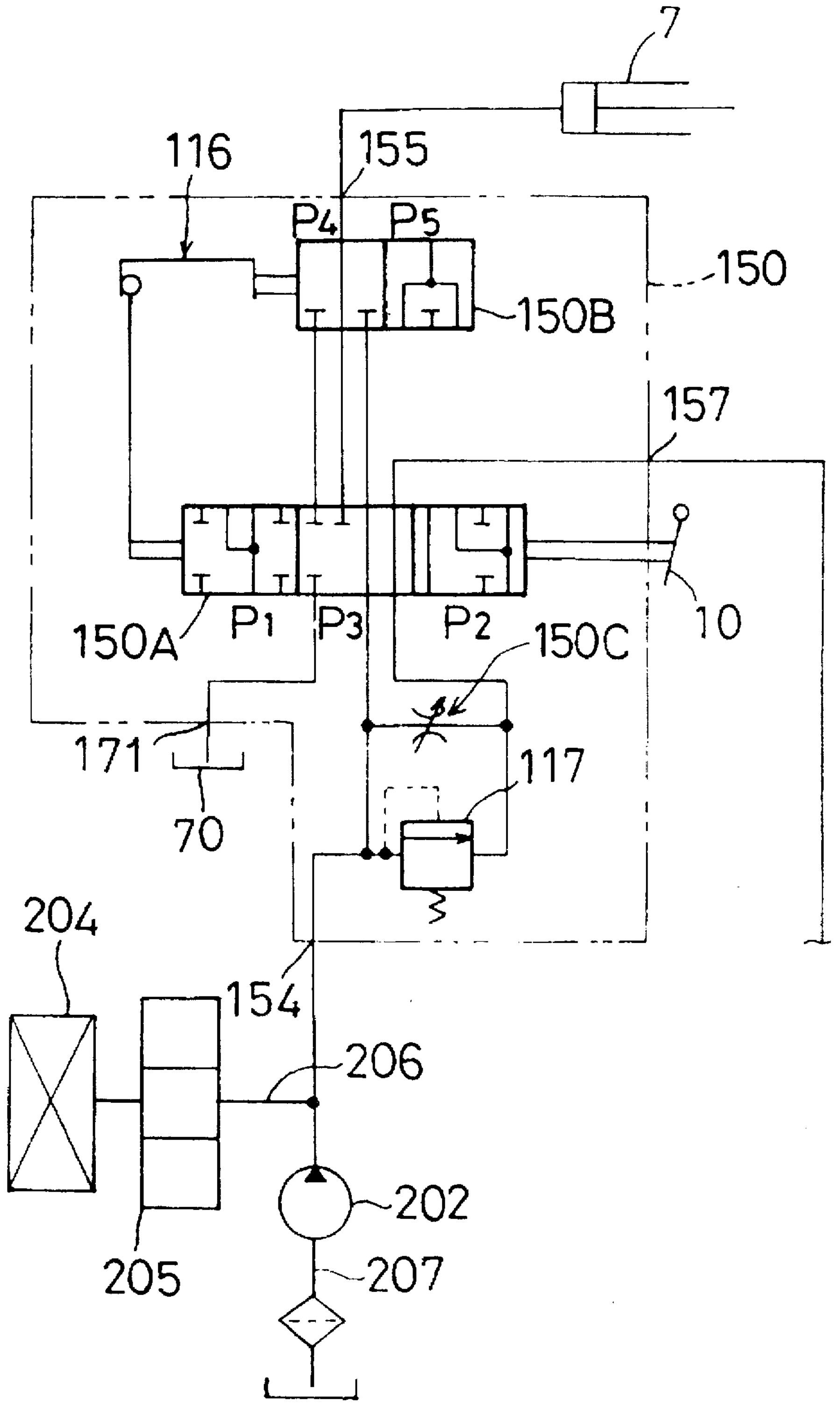
FIG. 20 is a diagram of hydraulic circuitry in the construction shown in FIG. 19.

A pump for a hydraulic clutch may be used as a hydraulic pressure source. As shown in FIG. 19, for example, a gear type transmission 200 includes an input shaft 201 having a gear pump 202 and a hydraulic clutch 204. The hydraulic clutch 204 is operable by a control valve 205 mounted on a surface of a transmission case 203 right over the gear pump 202. The control valve 205 communicates with the gear pump 202 through an oil passage 206 formed in the case 203, without requiring an outer piping. A suction pipe 207 extends downward from the pump 202 to draw oil from a lower position inside the transmission case 203. In this case, as shown in the hydraulic circuit diagram of FIG. 20, a hydraulic pressure from the gear pump 202 is supplied to both the clutch control valve 205 and valve unit 150 for raising and lowering the mower unit 4.

What is claimed is:

1. A hydraulic system for controlling a mower unit through a raising and lowering mechanism, comprising:

a hydraulic cylinder connected to said raising and lowering mechanism;

control means for controlling said mower unit, said control means having a raising position for raising said mower unit, a lowering position for lowering said mower unit, and a neutral position for maintaining said mower unit still;

hydraulic control valve means including a main control valve, an auxiliary control valve and a throttle valve connected in series between a hydraulic pressure source and said hydraulic cylinder, for selectively producing, in response to operation of said control means, a raising state for supplying pressure oil to said hydraulic cylinder to raise said mower unit, a lowering state for draining pressure oil from said hydraulic cylinder to lower said mower unit by gravity, a neutral state for stopping supply and drainage of pressure oil to/from said hydraulic cylinder to maintain mower unit still, and a half floating state for supplying pressure oil to said hydraulic cylinder and draining pressure oil from said hydraulic cylinder through said throttle valve to apply to said mower unit a raising force less than a gravitational lowering force; and interlock means for controlling said auxiliary control valve in response to movement of said main control valve, such that said hydraulic control valve means produces said half floating state when said control means moves from said lowering position to said neutral position.

2. A hydraulic system as defined in claim 1, wherein said main control valve is switchable among a raising position for connecting an oil line of said hydraulic cylinder to said hydraulic pressure source, a lowering position for connecting said oil line of said hydraulic cylinder to a drain tank, and a neutral position for connecting said oil line of said hydraulic cylinder to said hydraulic pressure source, and connecting said hydraulic pressure source to said drain tank through said throttle valve, said auxiliary control valve being switchable between a first position for shutting said oil line of said hydraulic cylinder, and a second position for opening said oil line of said hydraulic cylinder, said interlock means maintaining said auxiliary control valve in said second position when said main control valve is switched from said lowering position to said neutral position.

3. A hydraulic system as defined in claim 2, wherein said main control valve and said auxiliary control valve comprise rotary valves, and said interlock means comprises a cam mechanism for interlocking rotational displacements of rotary spools of said main control valve and said auxiliary control valve.

4. A hydraulic system as defined in claim 2, wherein said main control valve and said auxiliary control valve comprise slide valves, and said interlock means comprises an engaging mechanism for interlocking linear displacements of slide spools of said main control valve and said auxiliary control valve.

5. A hydraulic system as defined in claim 2, wherein said main control valve, said auxiliary control valve and said throttle valve are formed integrally with one another.

* * * * *